United States Patent Office 3,477,616
Patented Nov. 11, 1969

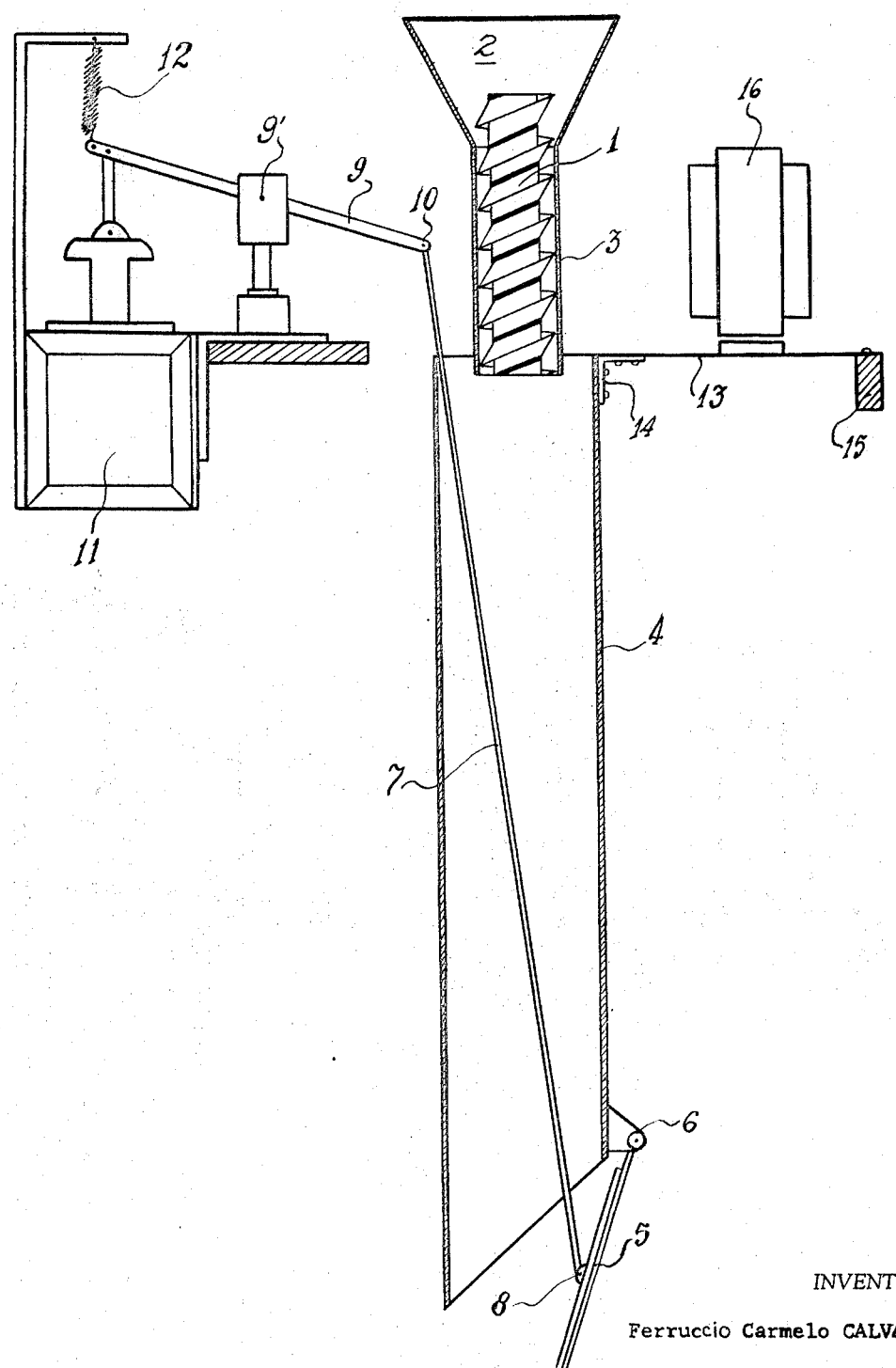

3,477,616
METERING DEVICE
Ferruccio C. Calvano, Buenos Aires, Argentina, assignor to Mainar S.A. Industrial, Buenos Aires, Argentina, a corporation of Argentina
Filed Jan. 16, 1968, Ser. No. 698,309
Int. Cl. B65g 3/12, 65/70, 33/14
U.S. Cl. 222—197    6 Claims

ABSTRACT OF THE DISCLOSURE

A metering device for machines for packing powdered and finely crystallized products comprising a hopper with a downwardly extending tubular portion, the lower end of this tubular portion extending into the upper end of an outer tube member. An endless screw member in the tubular portion of the hopper is continuously rotated by an adjustable control means at a predetermined speed, and metering into the package is completed through a closure member controlled by adjusting means which may be mechanical, electrical, electromechanical, hydraulic or pneumatic.

---

This invention relates to metering devices, and more particularly to an improved metered-volume dispensing device for use in connection with machines for packing powdered or finely crystallized foodstuffs or the like.

It is known that in order to measure powdered products which are not free-running, it is advantageous to use an endless screw feeder.

In metering devices of this type for packing powdered or like products in flexible containers, boxes, cans, plastic tubes or the like, the endless screw is rotated in an intermittent manner. This system has several disadvantages, such as a lack of accuracy in the metered quantities and the necessity of rather complicated mechanisms for actuating the endless screw in an intermittent manner.

The main object of this invention is to provide a metering device of the aforesaid type which will overcome the above drawbacks and insure a uniform metering of the powdered product and provide a simple device for removing the metered portions.

Briefly, the device of this invention comprises an adjustable system controlling the continuous rotational speed of an endless screw which is supplied from a hopper and will cause a continuous and uniform shower of the product to be packed. This continuous flow enters the upper end of a tube the lower end of which is provided with a shutter or cover which is actuated intermittently at equal periods of time in order to insure the supply of accurately metered portions.

Said tube is in turn vibrated during the entire time said shutter or cover is open, in order to insure that all the product accumulated in the tube will be packed, and also to avoid adherence of the powdered product to the inner walls of the tube. The endless screw, the outer screw-thread diameter of which corresponds to the inner diameter of the aforesaid tube, is located at the upper end of the tube and extends into said hopper.

The lower end of said tube housing the endless screw opens into the upper portion of a further tube, which is larger in diameter and adapted to receive the continuous flow of product. This larger tube is supported by resilient means in order to permit vibration thereof through suitable vibrator means, and the lower end thereof has a closure member connected to a member such as a rod for controlling the opening and closing of said closure member, the opposite end of such rod being connected to a control means, which may be pneumatic, mechanical, electrical or the like, depending on the necessities of the packing machine to which the device is applied.

In order that the invention may be more clearly understood and readily carried into practice, a presently preferred embodiment thereof has been schematically shown by way of example in the accompanying drawing.

With reference to the drawing, an endless screw 1, takes the product from a hopper 2, and passes it down continuously through a cylindrical conduit 3, and into a tube 4, the lower end of which is provided with a closure member 5, hinged to said tube 4, as at 6, and connected to one end of a rod 7, by means of a pivot pin 8. The opposite end of the rod 7, is connected to one end of a lever 9, by means of a connecting pin 10. The movements of said lever 9, which is fulcrumed at 9', is governed as shown by an electromagnet 11, and a coil spring 12.

The tube 4, is secured to one end of a vibrating strip 13, by means of a connecting angle bar 14, the other end of said strip 13, being fixed to the frame of a packing machine 15, the vibration of said strip being produced, for example, by a coil 16, and transmitted to the tube 4.

The endless screw 1, is rotated continuously at a predetermined speed, whereby the material in bulk in the hopper 2, will be conveyed by the screw threads down through the conduit or tube 3, and dropped in the form of a continuous shower into the tube 4, and retained therein by the closure member 5, which is held in closed position due to the action of the electromagnet 11.

An external program device, which is not shown, inasmuch as it is well known and forms no part of this invention, controls the electromagnet 11, which through the lever 9, will move the rod 7, to which it is connected at 10. When said external program device ceases to act on the electromagnet 11, the coil spring 12, will act on the lever 9, and rod 7, to open the closure member 5, hinged as at 6, to the tube 4.

As described above, the tube 4, is secured to and resiliently suspended from the vibrating strip 13, which on being actuated by the coil 16, will cause the continuous vibration of the tube 4, while the closure member 5, is in its open position. Thus, even in the case of powdered products which are not free-running, such vibration of the tube 4, will prevent any portion thereof from remaining adhered to the inner surface thereof.

Assuming that the revolutions per minute of the endless screw 1, are set so that it will supply in a uniform and continuous manner say 2 kg. of product per minute, and the program device is adjusted to cause 40 openings and closures of the closure member 5, per minute, the device will dispense 40 accurate portions of 50 grs. each per minute.

While a preferred embodiment of the invention has been described and illustrated, it should be understood that many changes and/or modifications will occur to those skilled in the art without departing from the scope of the invention as clearly set forth in the appended claims.

What is claimed is:

1. Metering device, particularly applicable to machines for packing powdered or finely crystallized products, comprising a hopper having a downwardly extending tubular portion, and endless screw member in said tubular portion, the lower end of said tubular portion extending into the upper end of an outer tube member, means for continuously rotating said endless screw at a predetermined speed, a resilient strip fixed at one end to said outer tube and adapted to be secured at the opposite end to a stationary part of a packing mechine, vibrator means associated with said resilient strip, a closure member for the lower end of said outer tube, hinge means connecting said closure member to said outer tube, a rod member pivoted at one end to said closure member, and adjustable means for controlling said closure member, associated with the other end of said rod member.

2. Metering device as claimed in claim 1, wherein said adjustable means for controlling said closure member is a mechanical means.

3. Metering device as claimed in claim 1, wherein said adjustable means for controlling said closure member is an electrical means.

4. Metering device as claimed in claim 1, wherein said adjustable means for controlling said closure member is an electro-mechanical means.

5. Metering device as claimed in claim 1, wherein said adjustable means for controlling said closure member is a hydraulic means.

6. Metering device as claimed in claim 1, wherein said adjustable means for controlling said closure member is a pneumatic means.

References Cited

UNITED STATES PATENTS

| | | | |
|---|---|---|---|
| 2,323,864 | 7/1943 | Weyandt | 222—199 |
| 2,333,435 | 11/1943 | Muskat | 222—199 |
| 3,146,918 | 9/1964 | Williams | 222—199 |
| 3,278,090 | 10/1966 | Wahl | 222—199 |

ROBERT B. REEVES, Primary Examiner